United States Patent [19]

Volk, Jr. et al.

[11] Patent Number: 4,678,424
[45] Date of Patent: Jul. 7, 1987

[54] CONTROLLED FAT INJECTION WITH STEAM IN A PELLET MILL

[75] Inventors: Joseph A. Volk, Jr., Florissant; Mark R. Kniepmann, St. Louis, both of Mo.

[73] Assignee: Beta Raven Inc., Hazelwood, Mo.

[21] Appl. No.: 755,082

[22] Filed: Jul. 15, 1985

[51] Int. Cl.$^4$ ............................ A23P 1/02; A23P 1/08
[52] U.S. Cl. .................................... 425/331; 99/483; 426/438
[58] Field of Search ..... 425/311, 331, 404, DIG. 230; 99/516, 468, 483, 485, 486, 467; 426/438

[56] References Cited

U.S. PATENT DOCUMENTS

| | | | |
|---|---|---|---|
| 2,324,874 | 7/1943 | Peters | 99/237 |
| 2,336,114 | 12/1943 | Meakin | 425/331 X |
| 2,553,788 | 5/1951 | Richardson et al. | 222/70 |
| 2,887,718 | 5/1959 | Curran et al. | 425/331 X |
| 3,101,040 | 8/1963 | Lanz | 99/235 |
| 3,215,094 | 11/1965 | Oldershaw et al. | 107/54 |
| 3,707,978 | 1/1973 | Volk, Jr. | 137/2 |
| 3,932,736 | 1/1976 | Zarow et al. | 235/151 |
| 4,119,742 | 10/1978 | Stupec | 426/641 |
| 4,183,292 | 1/1980 | Banks | 99/468 |
| 4,183,675 | 1/1980 | Zarow | 366/144 |
| 4,340,937 | 7/1982 | Volk, Jr. | 364/468 |
| 4,342,361 | 8/1982 | Volk, Jr. | 165/113 |
| 4,374,097 | 2/1983 | Holland | 425/331 X |
| 4,411,612 | 10/1983 | Holland | 425/331 X |
| 4,463,430 | 7/1984 | Volk, Jr. et al. | 364/468 |

Primary Examiner—Richard L. Chiesa
Attorney, Agent, or Firm—Rogers, Howell, Moore & Haferkamp

[57] ABSTRACT

A fat injection system for a pellet mill includes a plurality of nozzles mounted within the pelleting chamber and adjacent the die and rollers with a steam and fat line connected to each nozzle for mixing fat with steam and spraying the mixture onto the pellets immediately as they are formed.

20 Claims, 1 Drawing Figure

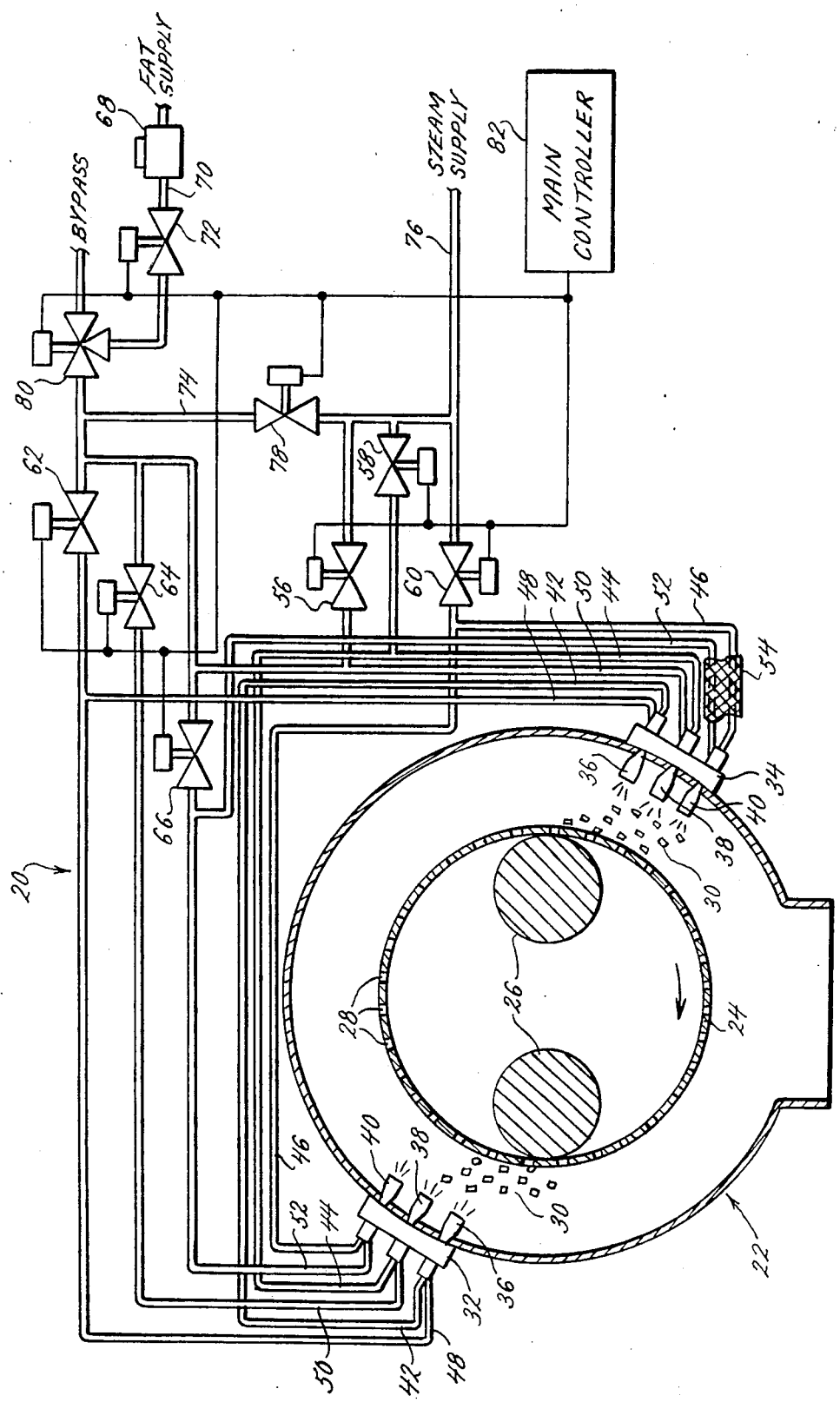

CONTROLLED FAT INJECTION WITH STEAM IN A PELLET MILL

BACKGROUND AND SUMMARY

The pelleting of food materials from various ingredients is well known in the art and the inventor herein is also the inventor of several different controllers which have revolutionized the pelleting process by automating pelleting. Some of the patents which have issued for his devices include the following: U.S. Pat. Nos. 3,707,978; 3,932,736; 4,340,937; 4,342,361; 4,463,430; and other patent applications which are pending.

It is well known in the art of pelleting that it is desirable to add fat into the finished pellet in controlled amounts. Generally, this is done by spraying hot liquid fat onto the pellets at some point after they have been formed and given an opportunity to dry. An example of this is shown in U.S. Pat. No. 3,101,040 issued Aug. 20, 1963. As shown therein, a special rotating drum is utilized to stir the pellets and a pipe with several nozzles extends the length of the drum and sprays hot fat onto the finished pellets. There are several disadvantages with the apparatus and method of the referenced patent, including the tendency of the fat to coat the surface of the pellet and not penetrate into the substance of the pellet itself which not only renders the fat coating subject to being removed by handling of the pellets, but also limits the amount of fat that can be added without introducing the problems of stickiness and congealing of the coating which is undesirable. Furthermore, the pipe and sprayers conducting the liquid fat are subject to clogging during use which detracts from the efficiency of the apparatus in coating the pellets with fat.

To solve these and other problems, the inventor herein has succeeded in developing a novel apparatus and method of utilizing steam as a carrier for the liquid fat, and also spraying the pellets immediately as they are formed within the chamber containing the pelleting die and rollers. With this approach, the fat has a greater tendency to migrate into the substance of the pellet both because of the increased moisture content of the pellet itself and the additional moisture and energy added by the steam. Thus, a greater amount of fat may be added to the pellets. Furthermore, there is no requirement for an additional rotating drum or other mechanical structure to achieve the application of fat to the pellets which minimizes initial cost for the equipment as well as decreased maintenance expenses and the like. In implementing the inventor's new apparatus and method for achieving fat injection with steam in the pellet mill, he has also developed a related control system which provides a method for regulating the amount of fat injected into the system, and also a way of utilizing steam to blow out the fat supply lines at the end of a run to minimize any tendency of the lines to clog, even temporarily, as might be experienced with the apparatus of the prior art.

A separate fat injection controller can be provided to control the various valves utilized to regulate and control the flow of fat and steam to the pellet mill, or the control for the fat injection system of the present invention may be incorporated into one of the inventor's prior automatic pelleting control systems using techniques well known to those of ordinary skill in the art. For example, for a microprocessor based controller, it would be a simple matter for one of ordinary skill in the art to modify the software program resident therein to control the additional functions required for fat injection using the inventor's apparatus and method disclosed and claimed herein.

The foregoing represents a brief description of some of the principal advantages and features of the present invention. A more complete understanding may be gained by referring to the drawing and description of the preferred embodiment which follows.

BRIEF DESCRIPTION OF THE DRAWINGS

The sole FIGURE is a schematic representation of the fat injection system of the present invention.

DETAILED DESCRIPTION OF THE PREFERRED EMBODIMENT

The fat injection system 20 of the present invention is shown in the drawing and includes a pellet mill 22 having a die 24 with a pair of rollers 26, the rollers 26 being situated substantially adjacent the die 24, and the die 24 having a plurality of holes 28 therethrough such that pellets 30 are formed as the die 24 and rollers 26 rotate. As is known in the art, the angular momentum of the die 24 imparts an angular velocity to the pellets 30 immediately as they are formed. A first group of nozzles 32 is mounted at about the ten o'clock position of the pellet mill 22 and a second group of nozzles 34 is mounted at approximately the four o'clock position. Each of these groups 32, 34 has three nozzles 36, 38, 40, and each of these nozzles may be appropriately sized to provide for different flow rates. For example, in the preferred embodiment, nozzle 36 would be a quarter inch, nozzle 38 would be three-eighths inch, and nozzle 40 would be one-half inch. Each nozzle 36, 38, 40 has an associated steam line 42, 44, 46 and an associated fat line 48, 50, 52, respectively. As shown representationally in the drawing, each pair of associated supply lines may be formed within a stainless steel braided hose 54 to provide both flexibility and some amount of heat transfer between the steam line and the fat line to minimize the tendency of the fat to congeal and clog the line.

Each associated steam line 42, 44, 46 has an associated steam valve 56, 58, 60, respectively to control the flow of steam through the associated steam supply lines. Similarly, each associated fat supply line 48, 50, 52 has an associated fat nozzle valve 62, 64, 66, respectively to control the flow of fat to its associated nozzles. A flow meter 68 provides an indication of the flow rate of fat through the main fat supply line 70, and a main modulating valve 72 regulates the amount of fat flowing through the main supply line 70 to the associated fat lines 48, 50, 52. An interconnecting line 74 extends between the main steam supply line 76 and the main fat supply line 70, and a steam blowout valve 78 acts in concert with a line bypass valve 80 to divert the flow of fat from the main fat supply line 70 and apply steam therethrough to the associated fat supply lines 48, 50, 52 to blow out the fat remaining in the lines and nozzles at the end of a run. A main controller 82, which may be a separate controller or which may be incorporated as part of the automatic pelleting system, controls the various valves in the fat injection system 20 of the present invention to not only regulate the supply of fat through the main fat supply line 70, but also select the appropriate size and number of nozzles 36, 38, 40 as is appropriate and desired to spray the fat and steam mixture onto the pellets 30 as they exit the die 24.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. In a pellet mill for processing a mash into pellets, said mill including a die, the die having a plurality of holes and at least one roller mounted inside the die and positioned substantially adjacent the die so that as the die and roller rotate, the roller squeezes the mash through the die holes to form pellets, the improvement comprising means to mix liquid fat with steam and spray the pellets with said heated fat mixture immediately after they are formed upon exiting through the die holes.

2. The device of claim 1 wherein the pellet mill includes a chamber enclosing the die and roller, and further comprising means mounting the spraying means in said chamber and exterior to the die.

3. The device of claim 2 wherein the pellet mill imparts an angular velocity to the pellets as they are formed, and wherein the spraying mounting means mounts said spraying means so that said pellets are propelled towards said spraying means by said pellet mill.

4. The device of claim 1 wherein the spraying means comprises a plurality of nozzles.

5. The device of claim 4 wherein each of said nozzles has a different flow rate capacity.

6. The device of claim 1 further comprising means to control the rate of fat being sprayed on said pellets.

7. The device of claim 6 wherein the spraying means includes a plurality of nozzles, and wherein each nozzle has an associated steam supply line and an associated fat supply line.

8. The device of claim 7 further comprising a valve means mounted in each steam supply line and in each fat supply line.

9. The device of claim 8 further comprising a main fat supply valve for controlling the rate of flow of fat to the fat supply lines.

10. The device of claim 9 further comprising means to control all of said valves to thereby control the flow of fat and steam.

11. The device of claim 10 further comprising a bypass valve and an associated bypass line to divert the flow of fat away from the spraying means.

12. The device of claim 11 further comprising a steam blowout valve and an associated steam blowout line connected between the steam line and the fat lines so that the fat lines can be controllably blown out with steam.

13. In a pellet mill for processing a mash into pellets, said mill including a die having a plurality of holes, and at least one roller mounted inside the die and positioned substantially adjacent the die so that as the die and roller rotate, the roller squeezes the mash through the die holes to form pellets, the roller and die being mounted inside a chamber, the improvement comprising a spraying means mounted inside the chamber and exterior to the die, means to supply fat and steam to said spraying means, said spraying means being positioned in said chamber with respect to said die and roller so that said spraying means is aligned to spray pellets with heated fat immediately as they are formed upon exiting through the die holes.

14. The device of claim 13 further comprising means to adjust the amount of fat being sprayed by said spraying means.

15. The device of claim 14 wherein said spraying means includes a plurality of nozzles, at least two of said nozzles having different flow rates, and means to control the flow of fat through said nozzles to thereby adjust the amount of fat sprayed by said spraying means.

16. The device of claim 15 wherein said fat flow control means includes a modulating valve, the fat supply means includes a main fat supply line, the modulating valve being mounted in said main fat supply line, and a controller for controlling said modulating valve to thereby control the flow of fat through said main fat supply line.

17. The device of claim 16 wherein each of said nozzles has an associated fat line and an associated steam line, and each of said associated fat and steam lines has an associated valve mounted therein, the controller having means to control said fat and steam valves to thereby control the flow of fat and steam to each of said nozzles.

18. The device of claim 17 further comprising a fat bypass valve mounted in said main fat supply line, a line interconnecting the main steam line with the main fat supply line, and a steam blowout valve mounted in said interconnecting line, the controller having means to control the fat bypass valve and the steam blowout valve to divert the flow of fat from said associated fat lines and blow the fat out of said associated fat lines.

19. The device of claim 18 further comprising means to mount said associated steam and fat supply lines for each nozzle in close proximity.

20. In a pellet mill for processing mash into pellets, said mill including a chamber, a die, the die having a plurality of holes, and at least one roller mounted inside the die and positioned substantially adjacent the die so that as the die and roller rotate, the roller squeezes the mash through the die holes to form pellets, the roller and die being mounted inside the chamber, the improvement comprising means to mix fat with steam and means to coat the pellets with said fat and steam mixture immediately as said pellets are formed inside the chamber upon exiting through the die holes.

* * * * *